United States Patent [19]

Derby

[11] Patent Number: 4,586,975
[45] Date of Patent: May 6, 1986

[54] METHOD OF AND APPARATUS FOR FACILITATING THE AUTOMATIC PROCESSING OF CHECKS

[75] Inventor: Steven C. Derby, Farmers Branch, Tex.

[73] Assignee: Check-Strip Ltd., Garland, Tex.

[21] Appl. No.: 655,982

[22] Filed: Sep. 27, 1984

Related U.S. Application Data

[63] Continuation of Ser. No. 529,748, Sep. 6, 1982, abandoned.

[51] Int. Cl.⁴ .......................... B31C 13/00; B31F 1/07
[52] U.S. Cl. ..................................... 156/191; 40/360; 156/209; 156/219; 156/270; 156/277; 156/324.4; 209/3.1; 209/547; 235/487; 235/488; 283/58; 427/177; 427/208.2; 427/275; 427/299; 428/57; 428/157; 428/172; 428/194; 428/200; 428/347; 428/906
[58] Field of Search ............ 156/209, 270, 219, 324.4, 156/191, 277, 64, 196, 157; 427/177, 275, 208.2, 299; 428/57, 194, 157, 200, 172, 347, 906; 40/360; 283/58; 235/487, 488; 209/3.1, 547

[56] References Cited

U.S. PATENT DOCUMENTS

| | | | |
|---|---|---|---|
| 3,128,219 | 4/1964 | Cummings | 156/238 |
| 3,575,289 | 4/1971 | Brousse | 428/906 |
| 3,586,834 | 6/1971 | Dykaar et al. | 235/487 |
| 3,661,669 | 5/1972 | Cairns | 156/209 |
| 3,702,924 | 11/1972 | Wood et al. | 235/487 |

Primary Examiner—John J. Gallagher
Attorney, Agent, or Firm—Michael A. O'Neil

[57] ABSTRACT

A length of material (10) is provided with an indented zone (18) which receives an adhesive layer (24). The outer surface (26) of the adhesive layer (24) is coplanar with the outer surface (12) of the length of material (10) thus providing a check processing tab (44) having a uniform cross sectional configuration. The check processing tabs are wound into rolls (30) and are ultimately adhesively secured to checks (34) with the outer surface (12) of the check processing tab (44) positioned in the same plane as the reverse side (46) of the check (34) and subtantially offset from the face (48) thereof.

13 Claims, 6 Drawing Figures

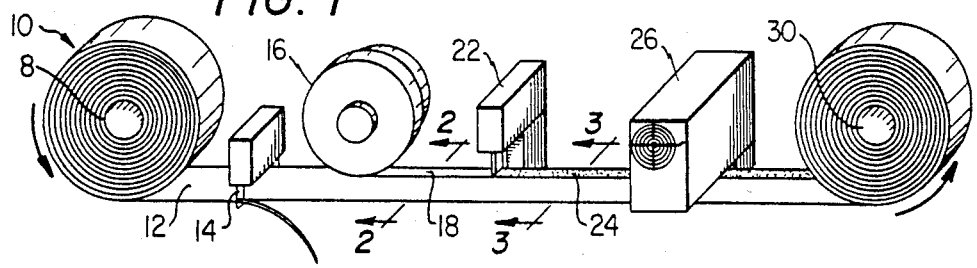
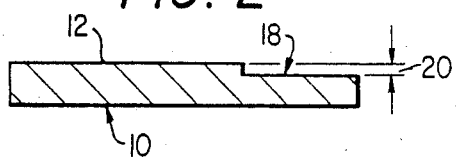
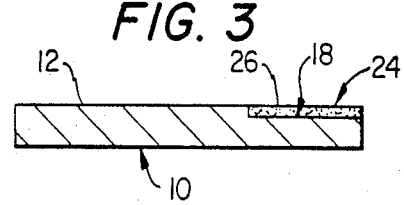
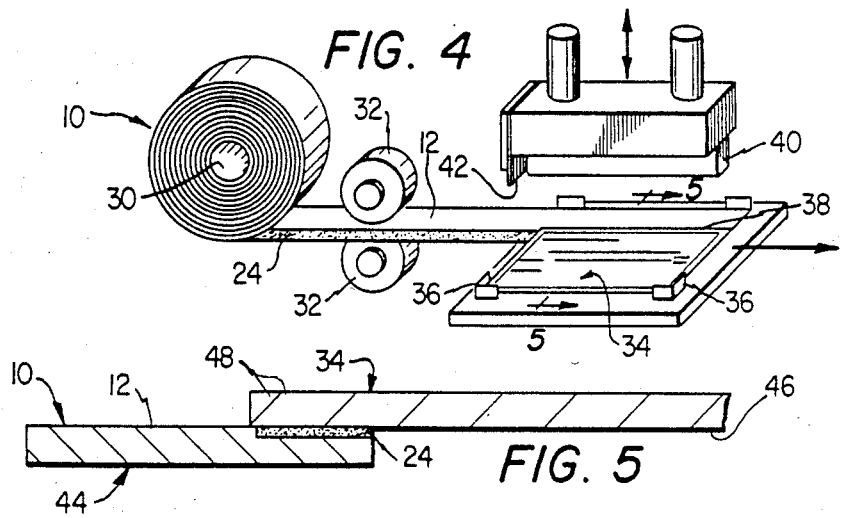
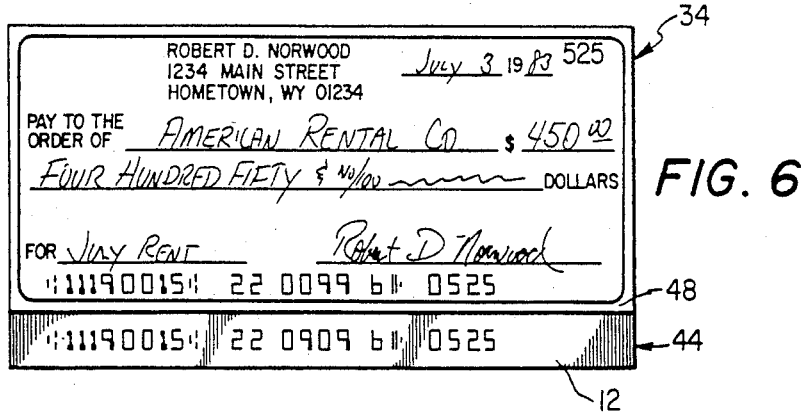

METHOD OF AND APPARATUS FOR FACILITATING THE AUTOMATIC PROCESSING OF CHECKS

This application is a continuation of application Ser. No. 529,748, filed Sept. 6, 1983, now abandoned.

TECHNICAL FIELD

This invention relates generally to the automatic processing of checks and similar documents, and more particularly to a system for facilitating the processing of checks which have been either mis-encoded or mutilated such that re-encoding is necessary in order to facilitate the automatic processing thereof.

BACKGROUND AND SUMMARY OF THE INVENTION

As is well known, checks and similar documents are now almost universally provided with a strip of machine readable indicia extending along the lower edge thereof to facilitate the automatic processing of the documents. For example, such indicia may take the form of magnetic ink which is printable in such a way as to be both visually readable and machine readable. In almost all instances, checks bearing such indicia move from the maker to the payee and through the banking system without incident, and in such cases the checking handling procedure is substantially fully automatic. Occasionally, however, a particular check may be either mis-encoded or mutilated to such an extent that the automatic processing of the check is impossible. In such cases it has been found desirable to provide means for re-encoding the check, whereby the automatic processing thereof is once again facilitated.

Numerous attempts have heretofore been made at providing a workable apparatus for facilitating the re-encoding of mis-encoded or mutilated checks. For example, U.S. Pat. Nos. 3,431,404; 3,531,628; 3,576,972; 3,588,456; 3,593,913; 4,060,711; and 4,128,202 all relate to check handling envelopes. U.S. Pat. No. 3,702,924 discloses a U-shaped check carrier which provides a strip extending beneath the lower edge of the check for receiving machine readable indicia.

U.S. Pat. Nos. 2,808,871 and 2,848,163 both relate to systems in which a tab is secured to the upper edge of each check and is provided with punched holes to facilitate the automatic processing thereof. U.S. Pat. Nos. 3,586,834; 3,770,943; and 4,278,880 all relate to systems wherein a tab is secured to the lower edge of a check and is adapted to receive the same indicia that was originally used to encode the check, for example, magnetic ink. In particular, U.S. Pat. No. 3,770,943 discloses a system wherein a check processing tab is secured to the lower edge of a check and is provided with an indicia receiving surface which is coplanar with the face of the check proper.

Notwithstanding the foregoing and other attempts at providing a workable system for handling mis-encoded and mutilated checks, it has been found that a need exists for still further improvements in the art. For example, it is no longer considered necessary to provide a check processing tab with an indicia receiving surface which is coplanar with the face of the check. The present invention incorporates these and other criteria to provide a method of and apparatus for facilitating the processing of checks which incorporates numerous advantages over the prior art.

In accordance with the broader aspects of the invention, a strip of check processing tab material has at least one surface adapted to receive machine readable indicia thereon. The strip is indented or otherwise processed along one edge of the indicia receiving surface to provide an indented zone. A layer of adhesive is then received in the indented zone. The adhesive layer is provided with an outermost surface which is coplanar with the indicia receiving surface of the strip.

The foregoing steps result in a check processing tab assembly having a uniform cross section throughout its width. This greatly facilitates the winding of the check processing tab assemblies into a roll and the subsequent unwinding of the check processing tab assemblies from the roll. That is, the tendency of prior check processing tab designs to twist in one direction during winding due to non-uniform cross sectional configurations is completely eliminated. Thus, by means of the present invention, check processing tab assemblies may be wound into a tight roll having no tendency to twist or turn in either direction. This facilitates not only a reduction in storage and transportation volume, but also eliminates any possibility that the roll of check processing tab assemblies will collapse during transportation or prior to usage, in which event the rewinding or replacement of the entire roll would be necessitated.

In accordance with more specific aspects of the invention, the adhesive that is received in the indented zone of the strip of check processing tab material is a thermal adhesive. This is highly advantageous in that it eliminates the need of a disposable layer for protecting the adhesive during transportation and storage. The check processing tab assemblies are secured to mis-encoded or mutilated checks by aligning the check to be re-encoded with one of the assemblies, activating the thermal adhesive of the assembly to secure the check thereto, and separating the attached check processing tab from the roll of unused check processing tab assemblies.

DESCRIPTION OF THE DRAWINGS

A more complete understanding of the invention may be had by reference to the following Detailed Description when taken in conjunction with the accompanying Drawings, wherein:

FIG. 1 is a diagrammatic illustration of a method of and apparatus for preparing check processing tab assemblies in accordance with the present invention;

FIG. 2 is a sectional view taken generally along the line 2—2 and FIG. 1 in the direction of the arrows;

FIG. 3 is a sectional view taken generally along the line 3—3 in FIG. 1 in the direction of the arrows;

FIG. 4 is a diagrammatic illustration of the attachment of check processing tab assemblies prepared as shown in FIG. 1 to checks requiring reincoding;

FIG. 5 is a sectional view taken generally along the line 5—5 in FIG. 4 in the direction of the arrows; and FIG. 6 is an illustration of the use of a check processing tab of the present invention to re-encode a check.

DETAILED DESCRIPTION

Referring now to the Drawings, and particularly to FIG. 1 thereof, there is illustrated a method of and apparatus for preparing check processing tab assemblies incorporating the present invention. A roll 8 comprised of strip of material 10 may be considered to be a series of check processing tab blanks. At least the outer surface 12 of the strip of material 10 is adapted to receive thereon characters of the type utilized to facilitate the automatic processing of checks, i.e., magnetic ink characters, etc. If the strip of material 10 is not of uniform width, knives 14 or other conventional apparatus are utilized to trim the material.

The strip of material 10 next passes through an embosser roll 16 which is utilized to form an indented zone 18 in the outer surface 12 of the material 10. Those skilled in the art will appreciate the fact that although the use of an embosser roll 16 is illustrated in FIG. 1, other conventional apparatus maybe utilized to form the indented zone 18, if desired. Referring specifically to FIG. 2, the indented zone 18 extends along one edge of the strip of material 10 and has a predetermined depth 20. In the actual practice of the invention the indented zone 18 preferably has a depth 20 of about 0.0005 inches.

After passing through the embosser 16, the strip of material 10 passes through an adhesive depositing apparatus 22. The function of the apparatus 22 is to deposit adhesive into the indented zone 18 formed in the outer surface 12 of the strip of material 10. As is best shown in FIG. 3, the apparatus forms an adhesive layer 24 in the indented zone 18 which substantially fills the indented zone. An important feature of the present invention comprises the fact that the adhesive layer 24 which is deposited in the indented zone 18 by the apparatus 22 has an outer surface 26 which is substantially coplanar with the outer surface 12 of the material 10. There is thus formed a check processing tab assembly comprising the material 10 and the adhesive layer 24 form thereon which is of substantially uniform cross section throughout its entire width.

Although other types of adhesives may be utilized in the practice of invention, the adhesive layer 24 preferably comprises one of the commercially available thermal or hot melt adhesives. The use of a thermal adhesive in the practice of the invention is preferred because by means thereof the necessity of utilizing an additional layer of material to protect the adhesive during transportation and storage is completely eliminated. Another advantage involves the fact that a thermal adhesive does not become adhesively attached either to checks or otherwise before it is activated, thereby facilitating the automation of apparatus incorporating the present invention.

After passing through the adhesive depositing apparatus 22, the strip of material 10 having the adhesive layer 24 deposit thereon passes through an adhesive cooling apparatus 26. Actually, the adhesive cooling and apparatus 26 may simply comprise structure for transporting the strip of material 10 and the adhesive layer 24 thereon through the ambient atmosphere for a sufficient period of time for the adhesive to cool. Other, more sophisticated types of cooling apparatus 26 may also be utilized in the practice of the invention, if desired.

Upon leaving the cooling apparatus 26, the strip of material 10 having the adhesive layer 24 thereon is wound into a roll 30. The uniform cross-sectionl configuration across the width of check processing tab assemblies comprising the invention is highly important in forming the roll 30. For example, consider the possibility of check processing tabs comprising a length of material having an adhesive layer deposited directly on the outer surface thereof. Assuming an adhesive layer thickness of 0.0005 inches, after only 1000 turns a roll comprising check processing tab assemblies so constructed would be fully ½ inch thicker on one side than the other. Under any circumstances such a roll is unstable, tending to collapse inwardly in the direction opposite from the location of the adhesive layer. Moreover, a roll comprising check processing tab assemblies so constructed cannot be tightly wound, because increased winding tension substantially increasing the possibility that the roll will collaspe during handling, transportation, storage, or use. In such cases, it is necessary to either rewind the roll of check processing tab assemblies, or to completely replace the entire roll.

By means of the present invention, the foregoing difficulty is completely eliminated. Since the check processing tab assemblies comprising the invention are characterized by a uniform cross section across the entire width thereof, the roll 30 has no tendency whatsoever to collapse. An additional benefit involves the fact that the roll 30 can be very tightly wound, which in turn substantially reduces the volume that is required for the transportation and/or storage of check processing tab assemblies incorporating the invention.

Upon completion, the roll 30 comprising check processing tab assemblies constructed in accordance with the invention is boxed or otherwise packaged together with other, similar rolls for transportation and/or storage prior to utilization in check reincoding operations. In the case of large banks, clearing houses, and other financial institutions, the operations illustrated in FIG. 1 are frequently undertaken on the premises of the financial institution. In the case of smaller financial institutions the operations illustrated in FIG. 1 take place at a manufacturing facility and the rolls of check processing tab assemblies are transported to the financial institution for use.

The use of check processing tab assemblies constructed in accordance with the present invention is illustrated in FIG. 4. A roll 30 comprising check processing tab assemblies constructed as shown in FIG. 1 and described herein above in conjunction therewith is unwound by passing the strip of material 10 through a pair of pinch rollers 32. A check or similar document 34 is positioned by suitable guide 36. The check 34 is positioned face up, and the adhesive layer 24 on the length of material 10 is positioned under the bottom edge of the check with the outer surface 12 of the length of material 10 extending beneath the lower edge 38 of the check.

A heated press 40 is then engaged with the face of the check 34. The heated press 40 activates the adhesive layer 24 carried by the strip of material 10, whereby the check processing tab assembly is adhesively secured to the reverse side of the check 34. Those skilled in the art will appreciate the fact that the use of a heated press to activate the adhesive layer 24 is not critical to the practice of the invention, and that numerous other conventional techniques may be used with equal facility in accordance with the requirements of particular applications of the invention. For example, a heated roller may be utilized to activate the adhesive layer. Other well known techniques include the use of radiant energy, the use of ultrasonic energy, etc., to activate the adhesive layer.

Prior to or following the activation of the adhesive layer, the check processing tab assembly is separated from the remainder of the length of material 10. For example, a knife edge 42 or other conventional apparatus may be utilized to sever the check processing tab assembly from the remainder of the length of material 10. Alternatively, the length of material 10 may be perforated or scored at periodic intervals to facilitate the manual separation of check processing tabs therefrom. Those skilled in the art will appreciate the fact that although the check processing tab shown in FIG. 5 is illustrated as having a length equal to that of the check 34, in actual practice the check processing tab need not be equal in length to the check 34, with the relative lengths of the check and the check processing tab being determined by the requirements of particular applications of the invention.

The result of the foregoing operations is illustrated in FIG. 5. A check processing tab 44 comprising a portion of the strip of material 10 having a portion of the adhesive layer 24 formed thereon is bonded to the reverse side 46 of the check 34. Thus, the outer surface 12 of the check processing tab 44 is coplanar with the reverse side 46 of the check 34, but is not coplanar with the face 48 thereof. In the practice of the invention it has been found that the offset relationship between the face 48 of the check 34 and the outer surface 12 of the check processing tab 44 is of no consequence whatsoever insofar as check re-encoding and subsequent automatic check processing operations are concerned.

Upon completion of the operations illustrated in FIG. 4, the check is re-encoded by means of the check processing tab adhesively secured thereto. Referring to FIG. 6, suitable indicia, for example magnetic ink characters, etc., are applied to the outer surface of the check processing tab. The check and the check processing tab having the required information encoded thereon are then directed through automatic check processing equipment utilizing conventional apparatus and procedures.

It will thus be understood that the present invention comprises a method of and apparatus for manufacturing check processing tabs which is straight forward and economical in practice, while incorporating numerous advantages over the prior art. Check processing tabs constructed in accordance with the invention are of uniform cross sectional configuration, whereby a series of check processing tabs may be wound into a roll without danger that the roll will collaspe. Rolls of check processing tabs incorporating the invention may be wound under substantially greater tension than is possible utilizing prior art techniques, whereby the volume that is required for the transportation and/or storage of check processing tabs incorporating the invention is substantially reduced. Other advantages deriving from the use of the invention will immediately suggest themselves to those skilled in the art.

Although particular embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

I claim:

1. A method of re-encoding checks comprising the steps of:
   providing a length of material having an outside surface adapted to receive re-encoding indicia thereon;
   mechanically compressing the outside surface of the length of material along one edge thereof to provide an indented zone which is substantially displaced inwardly from the outside surface of the length of material;
   forming an adhesive layer in the indented zone of the length of material having an outside surface which is substantially coplanar with the outside surface of the length of material;
   winding the length of material having the adhesive layer formed thereon into a roll;
   unwinding the length of material having the adhesive layer thereon from the roll and positioning the leading edge of the length of material adjacent the bottom edge of a check with the adhesive layer positioned beneath the reverse side of the check;
   utilizing the adhesive layer to secure a portion of the length of material to the reverse side of the check with the outside surface of the length of material positioned in a substantially spaced apart relationship relative to the face of the check;
   severing the trailing end of the length of material from the remainder thereof; and
   subsequently forming encoding indicia on the outside surface of the length of material.

2. The method according to claim 1 wherein the step of forming an adhesive layer in the indented zone is further characterized by forming a layer of thermal adhesive in the indented zone.

3. A method of re-encoding checks comprising the steps of:
   providing a length of material having an outside surface adapted to receive check re-encoding indicia thereon;
   forming an indented zone in the outside surface of the length of material which extends along one edge thereof;
   forming an adhesive layer in the indented zone having an outside surface which is substantially coplanar with the outside surface of the length of material;
   subsequently utilizing the adhesive layer to secure the length of material to the reverse side of a check with the length of material extending along one edge of the check and with the outside surface of the length of material positioned in a substantially offset relationship with respect to the face of the check; and
   forming check re-encoding indicia on the outside surface of the length of material.

4. The method according to claim 1 wherein the step of forming an indented zone is carried out by mechanically compressing a portion of the outside surface of the length of material.

5. The method according to claim 1 wherein the step of forming an adhesive layer in the indented zone is carried out by forming a layer of thermal adhesive material in the indented zone.

6. A method of manufacturing check processing tabs which comprises:
   providing a length of material having an outside surface adapted to receive check encoding indicia thereon;
   mechanically indenting the outside surface of the length of material along one edge thereof to provide an indented zone which is substantially inwardly displaced from the outside surface of the length of material; and
   forming an adhesive layer in the indented zone having an outside surface which is substantially coplanar with the outside surface of the length of material.

7. The check processing tab formed in accordance with the method of claim 6.

8. The method of claim 6 wherein the step of forming an adhesive layer in the indented zone is further characterized by forming a layer of thermal adhesive material in the indented zone.

9. The check processing tab formed in accordance with the method in claim 8.

10. A check processing tab comprising:
    a length of material having an outside surface adapted to receive check encoding indicia thereon;
    an adhesive layer extending along one edge of the length of material; said adhesive layer having an outside surface which is coplanar with the outside surface of the length of material.

11. The check processing tab according to claim 10 wherein the adhesive layer comprises a layer of thermal adhesive material.

12. A check processing tab comprising:
    a length of material having an outside surface adapted to receive check encoding indicia thereon;
    an indented zone formed in the outside surface of the length of material and extending along one edge thereof;
    an adhesive layer positioned within the indented zone formed in the length of material having an outside surface which is coplanar with the outside surface of the length of material.

13. The check processing tab according to claim 12 wherein the adhesive layer comprises a layer of thermal adhesive material.

* * * * *